(12) United States Patent
Grocutt

(10) Patent No.: US 11,989,425 B2
(45) Date of Patent: May 21, 2024

(54) APPARATUS AND METHOD FOR CONTROLLING ACCESS TO A SET OF MEMORY MAPPED CONTROL REGISTERS

(71) Applicant: Arm Limited, Cambridge (GB)

(72) Inventor: Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 11 days.

(21) Appl. No.: 17/759,426

(22) PCT Filed: Dec. 21, 2020

(86) PCT No.: PCT/GB2020/053326
§ 371 (c)(1),
(2) Date: Jul. 25, 2022

(87) PCT Pub. No.: WO2021/152282
PCT Pub. Date: Aug. 5, 2021

(65) Prior Publication Data
US 2023/0056039 A1    Feb. 23, 2023

(30) Foreign Application Priority Data

Jan. 30, 2020   (GB) .................................... 2001276

(51) Int. Cl.
*G06F 12/00*    (2006.01)
*G06F 3/06*     (2006.01)
*G06F 12/14*    (2006.01)

(52) U.S. Cl.
CPC .......... *G06F 3/0622* (2013.01); *G06F 3/0637* (2013.01); *G06F 3/0673* (2013.01); *G06F 12/1466* (2013.01)

(58) Field of Classification Search
CPC .... G06F 3/0622; G06F 3/0637; G06F 3/0673; G06F 12/1466
See application file for complete search history.

(56) References Cited

U.S. PATENT DOCUMENTS 7,130,977 B1    10/2006  Christie et al.
10,664,306 B2 *  5/2020  Krueger .................. G06F 9/467
(Continued)

FOREIGN PATENT DOCUMENTS

EP       2508984 A1     10/2012
WO    2017/048661 A1    3/2017

OTHER PUBLICATIONS

Bedichek, Robert, "Some Efficient Architecture Simulation Techniques", Department of Computer Science, FR-35 University of Washington, Seattle, Washington 98195, 1990.

*Primary Examiner* — John A Lane
(74) *Attorney, Agent, or Firm* — NIXON & VANDERHYE P.C.

(57) ABSTRACT

A technique for controlling access to memory mapped control registers. The apparatus has processing circuitry for executing program code to perform data processing operations, and a set of memory mapped control registers for storing control information used to control operation of the processing circuitry. Further, a lockdown register used to store a lockdown value. The processing circuitry is arranged to execute store instructions to perform write operations to a memory address space. The processing circuitry is arranged to prevent a write operation being performed to change the control information in the memory mapped control registers. This significantly reduces the prospect of an attacker seeking to exploit a software vulnerability to change the control information in the memory mapped control registers.

22 Claims, 10 Drawing Sheets

(56) References Cited

U.S. PATENT DOCUMENTS

| | | | |
|---|---|---|---|
| 11,341,230 B1* | 5/2022 | Ponnuswamy | H04L 63/083 |
| 2007/0156986 A1 | 7/2007 | Neiger et al. | |
| 2008/0250217 A1* | 10/2008 | Kershaw | G06F 12/1483 |
| | | | 711/E12.001 |
| 2010/0050266 A1 | 2/2010 | Cheng et al. | |
| 2014/0189261 A1 | 7/2014 | Hildesheim et al. | |
| 2019/0042780 A1* | 2/2019 | Brannock | G06F 21/64 |

* cited by examiner

APPARATUS AND METHOD FOR CONTROLLING ACCESS TO A SET OF MEMORY MAPPED CONTROL REGISTERS

BACKGROUND

The present technique relates to an apparatus and method for controlling access to a set of memory mapped control registers.

A data processing apparatus may have processing circuitry for executing program code, and control registers may be provided to store control information that is used to control the operation of the processing circuitry when executing the program code. Whilst traditionally such control registers may be provided as hardware registers directly accessible to the processing circuitry, it is becoming more common for one or more of those control registers to be provided as memory mapped registers. Hence, a certain region of the memory address space will be allocated for those control registers, and then those memory mapped control registers can be accessed by execution of a memory access instruction used to access memory, by arranging for the memory access instruction to specify an address that corresponds to the relevant memory mapped control register. By using memory mapped control registers, this may enable a reduction in the internal logic within the data processing apparatus, and thus assist in producing a data processing apparatus that is smaller, cheaper and more energy efficient. It may also mean that it easier to program the apparatus as the control registers can be accessed from high level languages such as C, rather than having to use dedicated instructions from assembly code.

Known memory access control mechanisms for controlling which regions of memory are accessible to which items of software executing on the data processing apparatus can be used to control access to the various memory mapped control registers. However, if there are any bugs in the software being executed on the system, this may enable an attacker to modify the contents of certain memory mapped control registers and thus compromise the system. For example, whilst a particular memory mapped control register may only be allowed to be updated by software executing at a particular trusted level, in the presence of a bug in trusted software it may be possible for an attacker running untrusted software to access a memory write gadget within the trusted software, and hence update the contents of one or more memory mapped control registers that the untrusted software should not have access to. Such an action could significantly compromise the system. For example, one or more of the memory mapped control registers may provide control information that is used to enforce the memory protection boundaries between the different items of software running on the system, and if the attacker is able to alter that control information this could significantly compromise the security of the system, by allowing the attacker to gain access to the private data of other software executing on the system.

It would hence be desirable to reduce the likelihood of an attacker being able to perform such an attack, whilst still allowing the contents of the control registers to be updated by trusted software.

SUMMARY

In one example arrangement, there is provided an apparatus comprising: processing circuitry to execute program code to perform data processing operations; a set of memory mapped control registers to store control information used to control operation of the processing circuitry when executing the program code; and a lockdown register to store a lockdown value; wherein: the processing circuitry is arranged to execute store instructions in order to perform write operations to a memory address space, the store instructions being of multiple types; and the processing circuitry is arranged, when the lockdown value is set, to prevent a write operation being performed to change the control information in the memory mapped control registers unless that write operation occurs due to execution of a store instruction from a first subset of the multiple types of store instructions.

In another example arrangement, there is provided a method of controlling access to a set of memory mapped control registers within an apparatus, comprising: executing program code on processing circuitry to perform data processing operations; storing, within the set of memory mapped control registers, control information used to control operation of the processing circuitry when executing the program code; storing within a lockdown register a lockdown value; executing store instructions on the processing circuitry in order to perform write operations to a memory address space, the store instructions being of multiple types; and when the lockdown value is set, preventing a write operation being performed to change the control information in the memory mapped control registers unless that write operation occurs due to execution by the processing circuitry of a store instruction from a first subset of the multiple types of store instructions.

In a still further example arrangement, there is provided a computer program for controlling a host data processing apparatus to provide an instruction execution environment, comprising: processing program logic to execute program code to perform data processing operations; and control program logic to maintain a set of memory mapped control data structures to store control information used to control operation of the processing program logic when executing the program code, and to maintain a lockdown data structure to store a lockdown value; wherein: the processing program logic is arranged to execute store instructions in order to perform write operations to a memory address space, the store instructions being of multiple types; and the processing program logic is arranged, when the lockdown value is set, to prevent a write operation being performed to change the control information in the memory mapped control data structures unless that write operation occurs due to execution of a store instruction from a first subset of the multiple types of store instructions. A computer readable medium may be provided for storing such a computer program, and the computer readable medium may be in a non-transitory or a transitory form.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
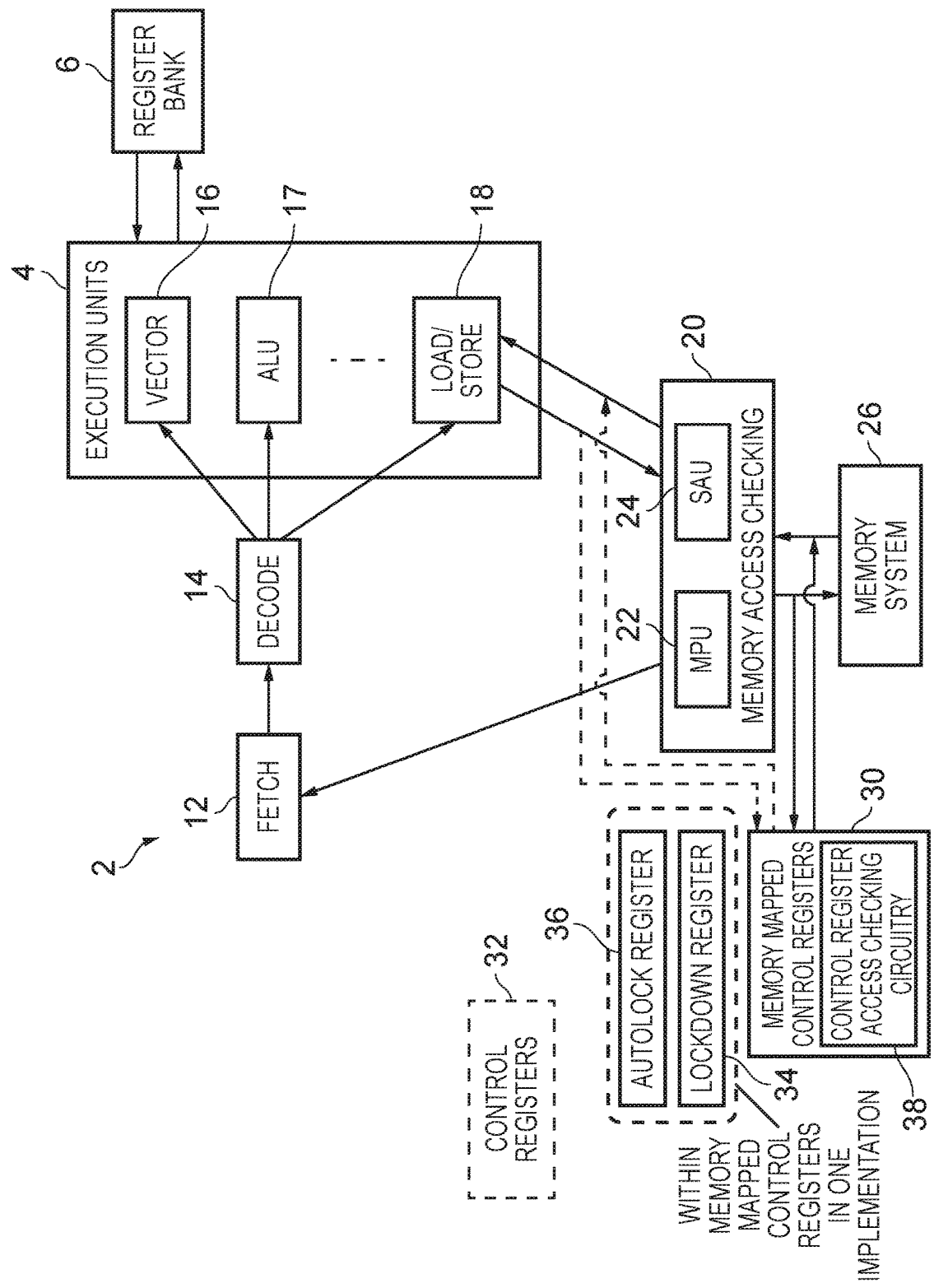
FIG. 1 schematically illustrates an example of a data processing system in accordance with one example arrangement.

In accordance with one example implementation, an apparatus is provided with processing circuitry for executing program code in order to perform data processing operations, and a set of memory mapped control registers for storing control information that is used to control operation of the processing circuitry when executing the program code. As mentioned earlier, it would be desirable to allow the contents of such memory mapped control registers to be updated using memory access instructions, but to reduce the possibility of an attacker being able to exploit a bug in the software executing on the apparatus in order to employ a memory write gadget within trusted software to alter the contents of one or more of the memory mapped control registers, which as mentioned earlier could compromise the security of the system.

In order to alleviate the risks of such an attack, the apparatus may be provided with a lockdown register that is used to store a lockdown value. The processing circuitry is arranged to execute store instructions in order to perform write operations to a memory address space, with those store instructions being of multiple types. When the lockdown value is set, the processing circuitry is arranged to prevent a write operation being performed to change the control information in the memory mapped control registers unless that write operation occurs due to execution of a store instruction from a first subset of the multiple types of store instructions. Hence, when the lockdown value is set, only store instructions within the first subset can be used to alter the control information in the memory mapped control registers. This significantly reduces the likelihood that an attacker can exploit a memory write gadget that could be used to alter the control information in the memory mapped control registers, since any memory write gadgets using store instructions that are not within the first subset cannot be used to achieve this aim when the lockdown value is set.

It will be appreciated that the actual value used to indicate the set state of the lockdown value may be varied dependent on implementation. In one particular example implementation, the lockdown value is set when it has a value of one, and is clear when it has a value of zero, but alternatively it will be appreciated that the lockdown value may be set when it has a value of zero and may be considered clear when it has a value of one.

Whilst the setting of the lockdown value can be used to significantly reduce the possibility of an attacker seeking to exploit a software vulnerability in trusted code to update the memory mapped control registers, backwards compatibility can be provided by allowing the lockdown value to be cleared. In particular, when the lockdown value is clear, the processing circuitry may allow a second subset of the multiple types of store instructions in addition to the first subset to be used to perform write operations to change the control information in the memory mapped control registers, where the second subset is non-overlapping with the first subset.

In one example implementation, the first subset and the second subset may collectively identify all of the different types of store instructions that can be used. However, in an alternative implementation there may be one or more types of store instructions that are not in the first subset or the second subset, and accordingly cannot be used to update the control information in the memory mapped control registers irrespective of whether the lockdown value is set or clear.

When the lockdown value is set, the processing circuitry will prevent any attempt to write to a memory mapped control register using a store instruction within the second subset of the multiple types of store instructions. In some implementations, the processing circuitry may additionally be arranged to raise a fault exception when a store instruction from the second subset attempts to perform a write operation to the set of memory mapped control registers.

A similar technique can also be used in association with load instructions used to read the contents of the memory mapped control registers. Hence, for example the processing circuitry may be further arranged, when the lockdown value is set, to only allow the control information in the memory mapped control registers to be read when that read occurs due to execution of a load instruction from a first subset of multiple types of load instructions, and to prevent the control information in the memory mapped control registers being read when that read occurs due to execution of a load instruction from a second subset of the multiple types of load instructions non-overlapping with the first subset.

As with the earlier-described processing of store instructions, the processing circuitry can also be arranged, in situations when the lockdown value is set, to raise a fault exception when a load instruction from the second subset attempts to perform a read operation to the set of memory mapped control registers.

The first subset of the multiple types of store instructions can take a variety of forms, but in one example implementation comprises a control register specific store instruction. The processing circuitry is then arranged, when executing the control register specific store instruction, to ignore the lockdown value when determining whether to allow the associated write operation to the memory mapped control registers to be performed. In some instance it may be the case that execution of a control register specific store instruction is always allowed to update the memory mapped control registers, but in some implementations one or more other access checks may need to be passed before allowing the write operation to proceed. For example, certain memory mapped control registers may only be accessible by software executing at a particular level of privilege, or in a particular security domain, and accordingly it may be checked that the software that includes the control register specific store instruction that is now being executed is allowed to access the particular memory mapped control register targeted by the control register specific store instruction, before allowing the write operation to proceed.

In one example implementation, the processing circuitry is arranged, when executing the control register specific store instruction, to raise a fault exception when a memory address identified by the control register specific store instruction lies outside a memory address range associated with the set of memory mapped control registers. This can be useful as it may be desirable to discourage software developers using the control register specific store instruction to access other areas in the memory address space that are not associated with memory mapped control registers, since this could increase the possibility of an attacker finding a suitable memory write gadget that could be exploited. In contrast, by ensuring that the control register specific store instruction is used sparingly, and in particular only when seeking to access the memory mapped control registers, this can significantly reduce the chance of a write vulnerability being present that can be exploited by an attacker. In particular, there is less chance that a memory write gadget that could be exploited by an attacker will include one or more instances of the control register specific store instruction.

There are a number of ways in which the memory address may be identified by the control register specific store instruction. In one example implementation, the memory address is identified in dependence on a value stored in a register specified by the control register specific store instruction and an immediate value specified by the control register specific store instruction.

Hence, in such implementations the control register specific store instruction does not directly identify the address of the memory mapped control register to be accessed, but instead execution of the control register specific store instruction causes the address of the required memory mapped control register to be computed based on the contents of a register (typically a general purpose register) specified in the instruction and an immediate value specified in the instruction. For example, the general purpose register may store a value used as a base address, and the immediate value may be added to that base address in order to identify the address of the memory mapped control register to be accessed.

In one particular example implementation, once the address has been computed, the execution of the control register specific store instruction may also cause that computed address to be written back to the identified general purpose register. This can for example enable multiple iterations of a loop containing the control register specific store instruction to be executed without needing to have separate instructions to alter the base address value used by the instruction.

In further example implementation, there may be multiple variants of the register specific store instruction capable of performing store operations of different sizes. For example there may be a variant of the register specific store instructions that stores a 32 bit value to a register, a variant that stores a 16 bit value to a register, and another variant that stores an 8 bit value to a register. These variants may be useful when only part of a larger register needs to be updated.

In addition to the earlier-mentioned control register specific store instruction, a control register specific load instruction may also be provided. Accordingly, when the processing circuitry is executing a control register specific load instruction, the lockdown value may be ignored when determining whether to allow the associated read operation to the memory mapped control registers to be performed. As mentioned earlier, one or more access checks may still need to be passed before the read is allowed to take place. Further, in an analogous way to that in which the control register specific store instruction is processed, the processing circuitry may be arranged, when executing the control register specific load instruction, to raise a fault exception when a memory address identified by the control register specific load instruction lies outside the memory address range associated with the set of memory mapped control registers. In an analogous way to the register specific store instruction, the register specific load instruction may not directly identify the address of the memory mapped control register to be accessed, but instead execution of the control register specific load instruction may cause the address of the required memory mapped control register to be computed based on the contents of a register (typically a general purpose register) specified in the instruction and an immediate value specified in the instruction. Similarly there may be variants of the register specific load instruction that perform load operations of different sizes.

In one example implementation, the lockdown register may be a hardware register directly accessible to the processing circuitry. However, in an alternative implementation, the lockdown register may be provided within the set of memory mapped control registers. This can simplify the processing of accesses to the memory mapped control registers, since it may avoid the need for a synchronisation barrier to be used when the lockdown value is changed. In particular, the memory address region reserved for the memory mapped control registers can be considered analogous to device memory, and as a result all store instructions to be executed in respect of that address region cannot be reordered, and instead need to be performed in order. Hence, for example, if the code being executed by the processing circuitry seeks to clear the lockdown value so as to allow subsequent standard store instructions to be used to update the contents of certain memory mapped control registers, then when the lockdown register is provided within the set of memory mapped control registers it can be guaranteed that the store instructions will be executed in the correct order without the need for a synchronisation barrier, and that accordingly the lockdown value will be cleared before any subsequent standard memory access instructions are executed, and hence the desired behaviour will be observed with regard to the update of the memory mapped control registers.

In situations where the lockdown register is provided within the set of memory mapped control registers, then the processing circuitry may be arranged to change the lockdown value in the lockdown register by execution of an instance of the control register specific store instruction with a specified memory address that maps to the lockdown register. In one example implementation, the lockdown value can only be altered by software executing at a particular level of trust, and accordingly if software not at that level of trust seeks to update the lockdown register using the control register specific store instruction, that update will fail.

Whilst each and every update to the contents of a memory mapped control register could be implemented by executing an instance of the control register specific store instruction, in some instances it may be desirable to allow bulk updates to multiple memory mapped control registers to be performed using standard store instructions. For example, the standard store instructions may include store multiple instructions that provide an efficient mechanism for updating the data across a range of memory addresses, and hence allow the data in multiple memory mapped control registers to be updated in response to execution of a single store multiple instruction. In one example implementation, rather than providing a store multiple variant of the control register specific store instruction, the lockdown value can be temporarily cleared to allow standard store instructions to perform the required updates to the memory mapped control registers.

In particular, the processing circuitry may be controllable by software to perform a sequence of accesses to the memory mapped control registers by executing the control register specific store instruction to clear the lockdown value, executing one or more standard access instructions to access the memory mapped control registers, and then executing a store instruction to set the lockdown value.

Whilst in one example implementation only the control register specific store instruction can be used to clear the lockdown value, it may be the case that any type of store instruction is allowed to set the lockdown value, and hence after the standard access instructions have been used to access the memory mapped control registers, the lockdown value may be allowed to be set again using a standard store instruction.

The control information stored in the memory mapped control registers can take a variety of forms, but in one example implementation comprises at least control information used to control which regions of the memory address space are accessible to trusted program code and untrusted program code.

In one example implementation, the processing circuitry is arranged to allow the trusted program code to update the lockdown value in the lockdown storage, and is arranged to use the lockdown value to control the performance of write operations to the memory mapped control registers by both the untrusted program code and the trusted program code. Hence, it should be noted that in such implementations the trusted program code that updates the lockdown value is not merely being used to restrict access to the memory mapped control registers by software of a lower level of privilege or a lower security state, but also the lockdown value set by the trusted program code will itself influence how the trusted program code can access the memory mapped control registers.

In other examples implementations, the processing circuitry is arranged to allow the trusted program code to update the lockdown value in the lockdown storage, and is arranged to use the lockdown value to control the performance of write operations to the memory mapped control registers by the trusted program code, whilst the performance of write operations to the memory mapped control registers by the untrusted program code is controlled independently of the state of the lockdown value. Hence, it should again be noted that the lockdown value is not being used to merely restrict access to the memory mapped control registers by software of a lower level of privilege or a lower security state. Such an arrangement may be useful in situations where other access checks prevent untrusted program code accessing critical registers, and there are non-critical registers that it is desirable to leave accessible to untrusted code whilst still locking down access to critical registers that are accessible to trusted program code.

The trusted program code and untrusted program code can take a variety of forms. In one example implementation, the processing circuitry is arranged to execute the program code in one of a plurality of states comprising at least an unprivileged state and a privileged state, the trusted program code is program code executed by the processing circuitry in the privileged state and the untrusted program code is program code executed by the processing circuitry in the unprivileged state.

Alternatively, or in addition, the processing circuitry may be arranged to execute the program code in one of a plurality of security domains comprising at least a secure domain and a less secure domain, the trusted program code is program code executed by the processing circuitry in the secure domain and the untrusted program code is program code executed by the processing circuitry in the less secure domain.

In implementations where the processing circuitry can execute program code in different security domains, and with different privileged states, then in each of the security domains the processing circuitry may be arranged to execute the program code in one of a plurality of states comprising at least the unprivileged state and the privileged state. In such an implementation, the lockdown register can be arranged to provide a lockdown value for each security domain. Hence, for example, the lockdown register can be banked so as to provide different lockdown values for each security domain.

As mentioned earlier, in one example implementation the lockdown value can be temporarily cleared in order to allow a block of accesses to the memory mapped control registers, for example on a context switch. However, if an interrupt occurs during such a context switch, the interrupt handler responsible for handling that interrupt may end up unintentionally running with the ability to access the memory mapped control registers using standard load and store instructions. Although this is more difficult to exploit, this could provide an opportunity for an attacker to update the memory mapped control registers in order to compromise the security of the system. In one example implementation, a lockdown value management process is performed in association with an exception in order to avoid such a situation arising. In one example implementation the lockdown value management process comprises, on occurrence of an exception, saving the lockdown value currently stored in the lockdown register so that it can be restored on return from the exception. However, in addition the lockdown value in the lockdown register is then set prior to triggering execution of an exception handling routine to process the exception. This means that when the exception handling routine is run, the exception handling routine will only be able to access the memory mapped control registers using memory access instructions within the first subset. Then, on return from the exception handling routine, the lockdown value can be restored in the lockdown register to the saved lockdown value, so that the code that was executing prior to the exception can then continue to execute using the lockdown value that was present prior to the exception being taken.

In some implementations, the above behaviour can always be implemented on the taking of an exception.

However, in an alternative implementation an autolock register can be used to store an autolock value, and the processing circuitry may be arranged to perform the setting of the lockdown value in association with the lockdown value management process on the occurrence of an exception, only when the autolock value is set. Hence, when the autolock value is set, not only is the current lockdown value as present in the lockdown register saved prior to taking the exception, so that it can be restored on return from the exception, but the lockdown value is also set in the lockdown register prior to triggering execution of the exception handling routine. However, when the autolock value is clear, then whilst the saving and restoring of the current lockdown value can still be performed prior to, and on return from, the exception handling routine, the lockdown value will not be set prior to triggering execution of the exception handling routine. This enables the lockdown value management behaviour that occurs in response to an exception to be configurable.

As with the lockdown register, the autolock register may be provided as a hardware register directly accessible to the processing circuitry, or alternatively may itself be provided as one of the memory mapped control registers.

There are a number of ways in which the lockdown value currently stored in the lockdown register may be saved during the lockdown value management process on occurrence of an exception. In one example implementation, on occurrence of an exception, the lockdown value currently stored in the lockdown register is saved as a field within a link register. The link register may typically be use to capture a return address, and the lockdown value can be provided as an additional bit within the link register. In some implementations portions of the address space are reserved and not executable. Branching to an address in such portions of the address space can therefore be used to signal special conditions, like a request for the hardware to perform an exception return to background state. In one example implementation, on entry to an exception, the return address captured in the link register can be set to a dummy return address specifying an address within the reserved, non-executable, address space, with the actual return address instead being saved on a stack. In such situations, the lockdown value currently stored in the lockdown register can be saved as part of the dummy return address in the link register.

Particular examples will now be described with reference to the Figures.

FIG. 1 schematically illustrates an example of a data processing system 2 including processing circuitry for performing data processing in response to instructions fetched from a memory system 26. The memory system 26 may include caches (e.g. one or more levels of data caches and/or instruction caches) as well as main memory. In some larger systems the main memory may comprise a single type of memory, for example DRAM, and in some small systems (for example, microcontrollers) the main memory may comprise different types of memory, such as Flash memory for storing program code and constant values, and SRAM for storing the stack and other values that change during execution. The processing circuitry provides a processing pipeline comprising a number of pipeline stages including, for example, a fetch stage 12 for fetching the instructions to be executed from the memory system 26, a decode stage 14 for decoding the fetched instructions to generate control signals for controlling the remaining pipeline stages to perform the data processing, and an execute stage comprising execution units 4 for executing the decoded instructions to perform data processing operations. Registers 6 are provided for storing source data (source operands) for access by the processing circuitry when executing instructions and for storing result data (destination operands) generated by execution of those instructions.

A variety of different execution units may be provided, for example a vector execution unit 16 for performing vector processing operations, an arithmetic logic unit (ALU) 17 for performing arithmetic operations, a load/store unit 18 for performing load and store operations to load data from memory 26 into the registers 6 or to store data from the registers 6 to memory 26, etc.

Figure 2:
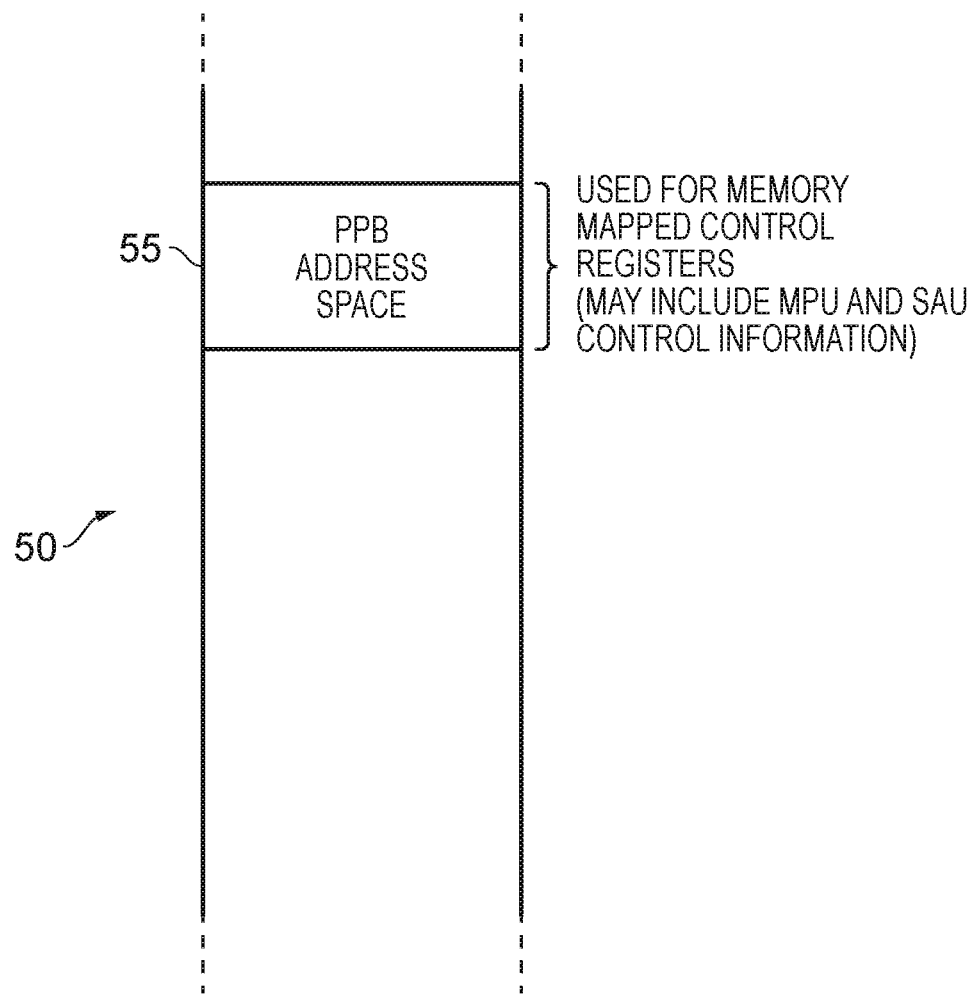
FIG. 2 schematically illustrates how a portion of the memory address space may be reserved for memory mapped control registers in accordance with one example arrangement.

Further, control registers may be provided for storing control information used to control operation of the apparatus 2. In accordance with the techniques described herein, at least some of the control registers are provided as memory mapped control registers 30 that are accessed using load and store instructions executed by the processing circuitry. As shown in FIG. 2 a certain region 55 of the memory address space 50 may be reserved for the memory mapped control registers, this region being referred to in FIG. 2 as the PPB (Private Peripheral Bus) address space, and hence an access to a given memory mapped control register may be performed by use of a load or store instruction that identifies an address within the region 55 that stores the control information of that given memory mapped control register. Optionally one or more further control registers 32 may also be provided as hardware registers directly accessible by the apparatus without execution of load or store instructions.

It will be appreciated that the pipeline stages shown in FIG. 1 are a simplified representation, and other types of pipeline stages could also be provided, such as a rename stage for performing register renaming, an issue stage for queueing instructions awaiting execution and issuing them for execution when their required source operands are available, and a write back stage for handling commitment of instructions and writing back results to the registers 6. The pipeline could be an in order or out of order pipeline.

The apparatus 2 can be arranged in a variety of ways. For example, it could operate in a single security domain, but with the processing circuitry being able to operate in both privileged and unprivileged states. Alternatively, the apparatus may have a secure domain and a less secure domain, and only a single processing state in each security domain. In a further example, the apparatus 2 may only operate in a single security domain and privilege level.

However, for the purposes of the examples discussed herein, a system will be considered where the processing circuitry is able to operate in multiple security domains, including a secure domain and a less secure domain, and where within each security domain the processing circuitry is able to operate in a plurality of processing states, including an unprivileged state and a privileged state.

In such an apparatus 2, memory access checking circuitry 20 may also be provided for checking whether accesses to the memory system 26 are permitted based on attribute data specified for various regions of a memory address space. The memory access checking circuitry may include a security attribute unit (SAU) 24 for storing security domain defining data which defines a security domain associated with each respective region of the memory address space. Based on the security attribute data, the security attribute unit 24 may check whether a memory access is allowed depending on a current security domain of operation of the processing circuitry and on the security domain associated with the region including the target address of the memory access. In other implementations the SAU 24 may not directly store the security domain defining data, but instead may access security domain defining data stored elsewhere in order to perform the memory access checks. In some systems the security domain defining data may be stored in control registers, for example the memory mapped control registers 30.

The processing circuitry may operate in a current security domain of operation, which may generally correspond to the security domain associated with the address of the instruction currently being executed (although there may be some exceptions, e.g. when handling transitions between domains). When an instruction branches from an address in a region specified by the SAU 24 as being in one domain to an address in a region associated with a different domain, this may trigger a transition of the current security domain in which the processing circuitry is operating. In other implementations such a branch may not directly trigger a transition of the current security domain, but instead trigger additional security checks, such as whether a gateway instruction is present. In these implementations it may be the gateway instruction itself that triggers the change in the current security domain. For some other types of security domain transition a special branch instruction may be used to branch to executing instructions at an address specified by the instruction, and in a different security state. In general, while operating in a secure domain, the processing circuitry may have access to data in memory regions associated with both the secure domain and a less secure domain, whilst when operating in the less secure domain the processing circuitry may have access to the data in regions associated with the less secure domain but may not be permitted to access data in regions of the address space which the SAU 24 specifies as being associated with the secure domain. This enables protection of sensitive data against unauthorised access from code operating in the less secure domain.

Also, the memory access checking circuitry may include a memory protection unit (MPU) 22 which checks whether memory accesses to the memory system 26 satisfy access permissions which may specify, for example, which privilege levels of the processing circuitry are allowed to access a given region of memory, or may specify whether a memory region of the address space can be accessed by both read and write operations or is a read only region for which writes are prohibited. The access permissions used by the MPU 22 may for example be specified by a more privileged process (such as a hypervisor or an operating system) to control which regions of memory a less privileged process (such as an application) is allowed to access, and how (read only or read/write). The permissions provided by the MPU 22 may be orthogonal to those provided by the SAU 24, so that for a given memory access to be allowed, it should pass the checks based on the access permissions defined for both the MPU 22 and the SAU 24. Although the MPU 22 is shown as a single entity in FIG. 1, in some examples separate secure and less secure MPUs 22 may be provided, each associated with one of the security domains, so that different memory access permissions can be specified for a given region of memory depending on whether the current domain is the secure domain or the less secure domain (e.g. a region could be read only in the less secure domain but both readable and writable in the secure domain).

Accesses to the memory system 26 will typically be subjected to checks by the memory access checking circuitry 20. Accesses to the memory mapped control registers 30 may also be subjected to checks by the memory access checking circuitry 20, or in some instances the memory mapped control registers 30 may be accessed without performing the memory access checks (as shown by the dashed lines in FIG. 1). In some embodiments allowing accesses to the memory mapped control registers 30 to bypass the memory access checking circuitry 20 may permit fine grained access control checking to be performed by the memory mapped control registers 30 themselves. For example untrusted software map have access to only a subset of the bits with a single register. Providing this granularity of access permissions checking in a general structure like the SAU 24 or MPU 22 may be impractical as such structures may be limited by a minimum region, for example 32 bytes.

Figure 3A:
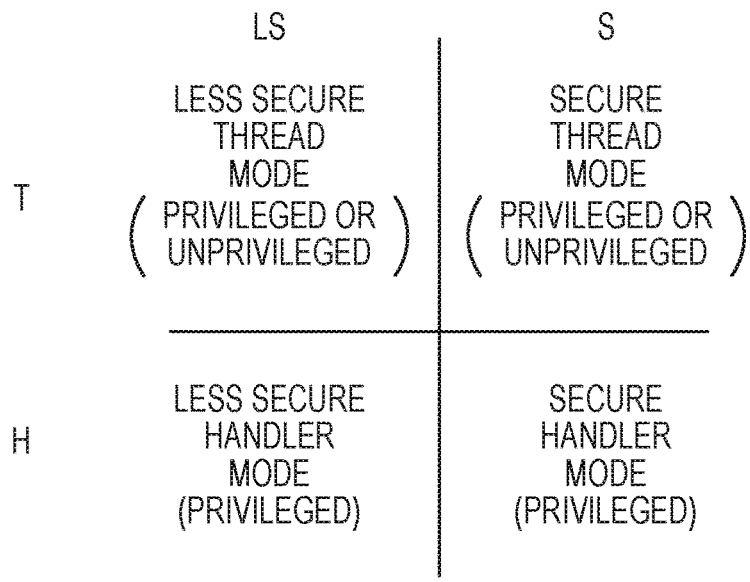
FIG. 3A shows an example of different domains and modes of operation of the processing circuitry of FIG. 1, in accordance with one example arrangement.

As shown in FIG. 3A, the apparatus 2 may support performing data processing in one of a number of security domains including at least a secure domain (S) and a less secure domain (LS). Although FIG. 3A shows a system with only two security domains, it would be possible to provide three or more domains associated with different levels of security.

Also, within a given security domain, as shown in FIG. 3A the apparatus may perform data processing in one of a number of modes, including a handler mode (H) and a thread mode (T). The handler mode is typically used for exception processing, and hence for example an exception handling routine may be executed in the handler mode. The thread mode is typically used for running different threads, for example different application threads. When operating in the handler mode H then the processing circuitry may by default be assumed to have a more privileged mode of operation so that access to memory and control registers is controlled according to a certain level of privilege level other than the less privileged level, while in the thread mode T the processing circuitry may have one of a number of different privilege levels depending on other architectural state stored in control registers.

Hence as shown in FIG. 3A, the combination of the security domain and the mode in which the processing circuitry is operating may determine aspects of how processing is carried out by the processing circuitry. FIG. 3A shows four different combinations of these modes, including:

a secure thread mode (shorthand for the combination of the secure domain and the thread mode)

a less secure thread mode (combination of the less secure domain and the thread mode)

a secure handler mode (combination of the secure domain and the handler mode) and a less secure handler mode (combination of the less secure domain and the handler mode).

As discussed earlier, due to some of the control registers being memory mapped control registers, this can give rise to the opportunity for an attacker to compromise the system in situations where the attacker can exploit a bug and make use of a memory write gadget within software at a level of trust that is allowed to access those memory mapped control registers. This could be particularly problematic when some of the control registers store control information that controls which items of software can access which regions of memory. In particular, by such an attack the attacker may be able to compromise the security of the system, by removing or altering some of the memory protection boundaries enforced by the MPU 22 and/or SAU 24, through appropriate modification of the control information used to control the operations of those memory access checking components. As will be discussed in more detail herein, the likelihood of an attacker being able to perform such an attack can be significantly reduced through use of a lockdown value within a lockdown register 34 shown in FIG. 1. As also shown in FIG. 1, an autolock register 36 may also be provided in some implementations to provide enhanced protection when handling exceptions. Both the lockdown register 34 and the autolock register 36 can be provided as hardware control registers directly accessible by the apparatus, but in one particular example implementation are provided as control registers within the memory mapped control registers 30, and hence may be accessed using memory access instructions. As shown in FIG. 1, the processing circuitry may provide control register access checking circuitry 38 that can be used to control access to at least some of the memory mapped control registers 30 in dependence on the value of the lockdown value in the lockdown register 34.

Figure 3B:
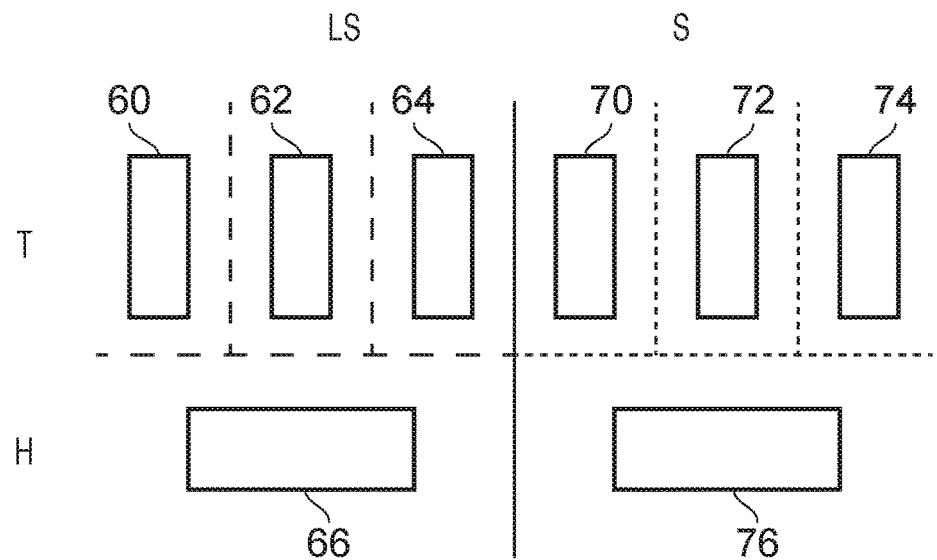
FIG. 3B illustrates how access boundaries may be enforced between the various items of software running on the processing circuitry of FIG. 1, using control information stored in memory mapped control registers, in accordance with one example arrangement.

As shown in FIG. 3B, when considering the different modes of operation shown in FIG. 3A, FIG. 3B illustrates how control information in certain of the memory mapped control registers 30 can be used to enforce memory access boundaries between different items of software executing within the system. For example, within the less secure thread mode, the processing circuitry may be arranged to execute multiple threads 60, 62, 64, and if desired MPU control information for the less secure domain as provided in the memory mapped control registers may be used to enforce access boundaries between the different threads. This can for example be used to ensure that the data being processed by one thread is kept private from other threads, if that is considered appropriate. As also shown in FIG. 3B, such MPU control information for the less secure domain can also enforce an access boundary between the less secure thread mode and the less secure handler mode, so that data processed by software 66 executing in the less secure handler mode is kept private from any of the threads 60, 62, 64 executing in the less secure thread mode.

Similarly, equivalent MPU control information may be provided within the memory mapped control registers 30 for the secure domain, and hence may be used to enforce partitions between different threads 70, 72, 74 executing in the secure thread mode, and also to enforce an access boundary between the threads running in the secure thread mode and software 76 executing in the secure handler mode.

As also shown in FIG. 3B, SAU control information may be stored in a memory mapped control register to enforce an access boundary between the secure domain and the less secure domain, for example to ensure that software executing in the less secure domain cannot access data associated with the secure domain.

Whilst these access boundaries enforced by the control information in the relevant memory mapped control registers can provide a fine grained level of protection for the data accessed by the various items of software executing on the processor, a problem can arise if any bugs are present within the software that can be exploited by an attacker. As an example, an attacker may arrange for unprivileged software 60 in the less secure thread mode to be executed, but a software bug may enable that software 60 to trigger a memory write gadget within software 66 executing in the less secure handler mode, which could for example enable the software 60 to use the memory write gadget to update the relevant memory mapped control register 30 so as to alter the access boundaries enforced by the MPU control information in the less secure domain. This could for example enable the boundary between the less secure thread mode and the less secure handler mode to effectively be removed.

As another example, an attacker may be able to exploit a software bug so that software 66 operating in the less secure handler mode may be able to exploit a bug in software 76 executing in the secure handler mode to trigger a memory write gadget within software 76 to update the memory mapped control registers so as to alter the access boundary enforced by the SAU control information. In a worst case scenario, this may enable the boundary between the secure domain and the less secure domain to effectively be removed, whereafter software in the less secure domain would be able to access data applicable to the secure domain.

However, as will be discussed in more detail herein, through use of the lockdown value in the lockdown register 34, it is possible for the ability of an attacker to seek to implement any of the above attacks to be significantly reduced.

Figure 4:
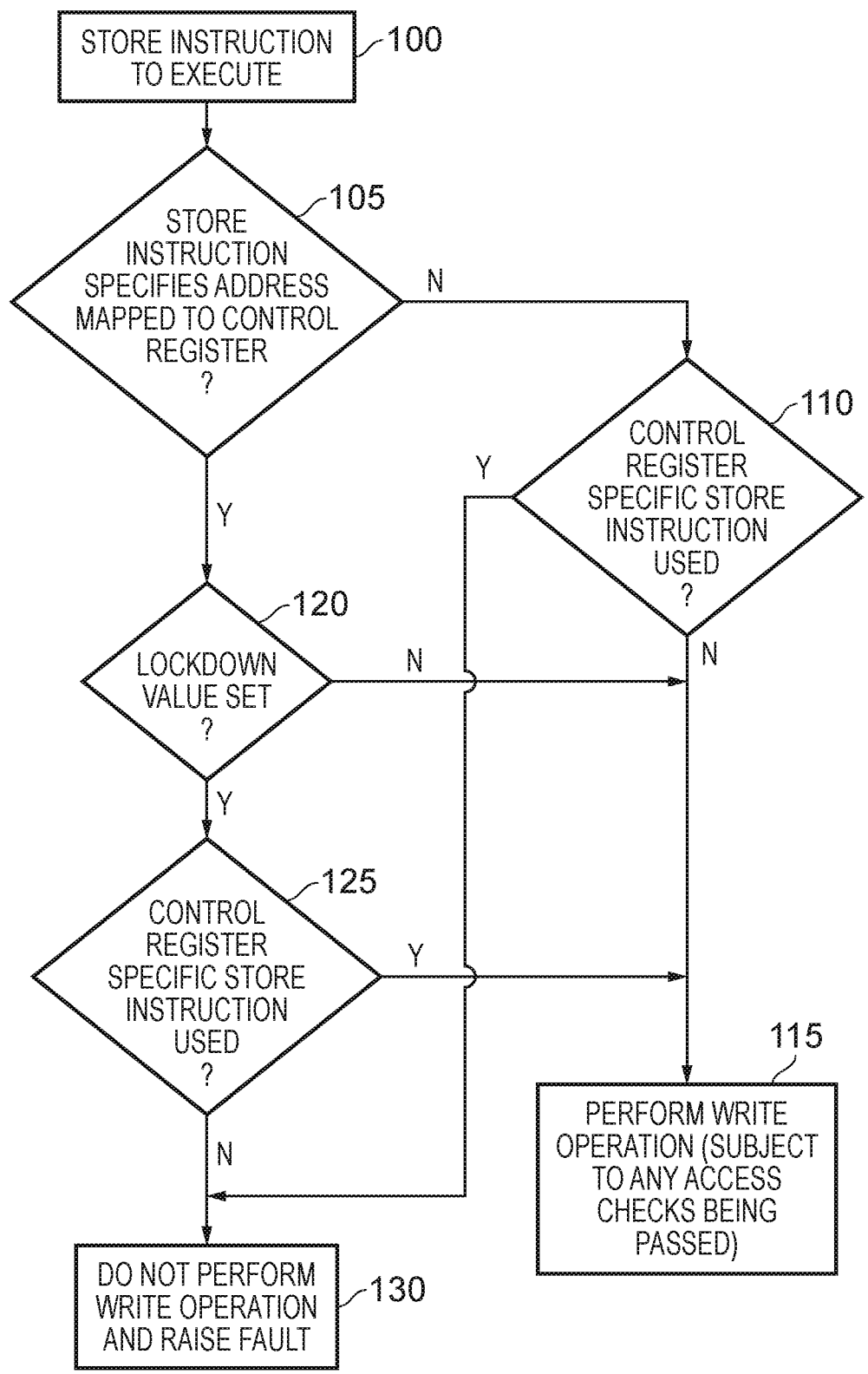
FIG. 4 is a flow diagram illustrating steps performed when executing a store instruction in accordance with one example arrangement.

FIG. 4 is a flow diagram illustrating how a store instruction may be executed in accordance with one example implementation, dependent on the lockdown value set in the lockdown register 34. At step 100, a store instruction is encountered that is to be executed by the processing circuitry, and in particular by the load/store unit 18. At step 105 it is determined whether the store instruction specifies an address mapped to one of the control registers 30. As discussed earlier, the address applicable for the store instruction can be determined in a variety of ways. For example, the store instruction may specify a source register that contains a base address, and may also specify an immediate value that is used to adjust that base address in order to determine the address to be accessed by the store instruction. It can then be determined whether that address is within the address region 55 associated with the memory mapped control registers 30, and hence determine where the store instruction is seeking to access one of those control registers.

If not, the process proceeds to step 110 where it is determined whether a control register specific store instruction is being used. In particular, in accordance with the techniques described herein, one or more types of control register specific store instruction can be defined, in addition to the usual types of store instruction that may be used to perform write operations in respect of memory. In order to maximise the ability to inhibit the earlier described attacks, it is desirable for such control register specific store instructions to be used very sparingly, and in particular only to be used when accessing the memory mapped control registers. Hence, if at step 110 it is determined that a control register specific store instruction is not used, then this is the expected behaviour given that at step 105 it was determined that the store instruction was not accessing one of the memory mapped control registers, and accordingly the process proceeds to step 115 where the required write operation may be performed. It will be appreciated that whether the write operation is in fact performed may be subject to any access checks that need to be passed having regards to the memory address that is being accessed, such memory checks for example being performed by the memory access checking circuitry 20 discussed earlier.

However, if at step 110 it is determined that a control register specific store instruction is being used, then in the example illustrated in FIG. 4 this is unallowed behaviour since the address being accessed is not mapped to one of the control registers, and accordingly the process proceeds to step 130 where the write operation is not performed, and instead a fault exception is raised.

If at step 105 it is determined that the store instruction does specify an address that is mapped to one of the memory mapped control registers, then at step 120 the processing circuitry (in the example of FIG. 1 the control register access checking circuitry 38) determines whether the lockdown value is set. If not, then the system is operating in a standard mode where the extra protection afforded by the present technique is not utilised, and accordingly the process proceeds to step 115 where the write operation is performed subject to any relevant access checks being passed.

However, if it is determined that the lockdown value is set, then the access will only be allowed to proceed if a control register specific store instruction is being used. This is accordingly checked at step 125, and provided a control register specific store instruction is being used, the process proceeds to step 115 where the write operation is performed, again subject to any access checks that may be required. As discussed earlier, in one example implementation accesses to the memory mapped control registers may not be subjected to checks by the memory access checking circuitry 20, and the access path may instead follow that shown by the dotted lines in FIG. 1. In such cases accesses may be checked by fine grained checking circuitry as part of the memory mapped control registers 30.

However, if at step 125 it is determined that the control register specific store instruction is not being used, then the write operation is prevented, and the process proceeds to step 130 where the write operation is not performed, and instead a fault exception is raised.

Whilst the process of FIG. 4 is shown in respect of the execution of a store instruction, an analogous process can be performed to process load instructions, and again at least one control register specific variant of a load instruction may be provided, and when the lockdown value is set a read from the memory mapped control registers will only be possible using such a control register specific load instruction.

By such an approach, this can significantly reduce the attack surface available to an attacker seeking to exploit the above described types of attack. In particular, when the lockdown value is set, the attacker would need to find a suitable memory write gadget that could be exploited via a software bug, and in this instance that memory write gadget would need to include one or more of the control register specific store instructions, since otherwise the presence of the lockdown value being set will prevent any write operation instigated by the attacker using that memory write gadget from being performed in respect of the contents of the memory mapped control registers. Similarly if an attacker seeks to exploit a bug to use a memory read gadget to gain access to secret information in the memory mapped control registers 30 (such as an encryption key), they would need to identify an instance of a memory read gadget that included one of more of the control register specific load instructions.

As mentioned earlier, the lockdown register 34 used to store the lockdown value may be a hardware control register directly accessible by the apparatus, but in one example is implemented as one of the memory mapped control registers 30. By using one of the memory mapped control registers to provide the lockdown register, this avoids the need for any synchronisation barrier. In particular, the address space 55 reserved for the memory mapped control registers can be considered to be device memory, and for such memory it is not possible to reorder store instructions. Since in such a scenario a store instruction would need to be used to update the contents of the lockdown register, this ensures that any change in the value of the lockdown value occurs at the correct point in time relative to preceding and subsequent read and write operations in respect of the memory mapped control registers. Accordingly the intended access behaviour can be ensured without needing to perform any synchronisation of the time at which the lockdown value is changed and the time memory access operations are performed in respect of the memory mapped control registers.

Figure 5:
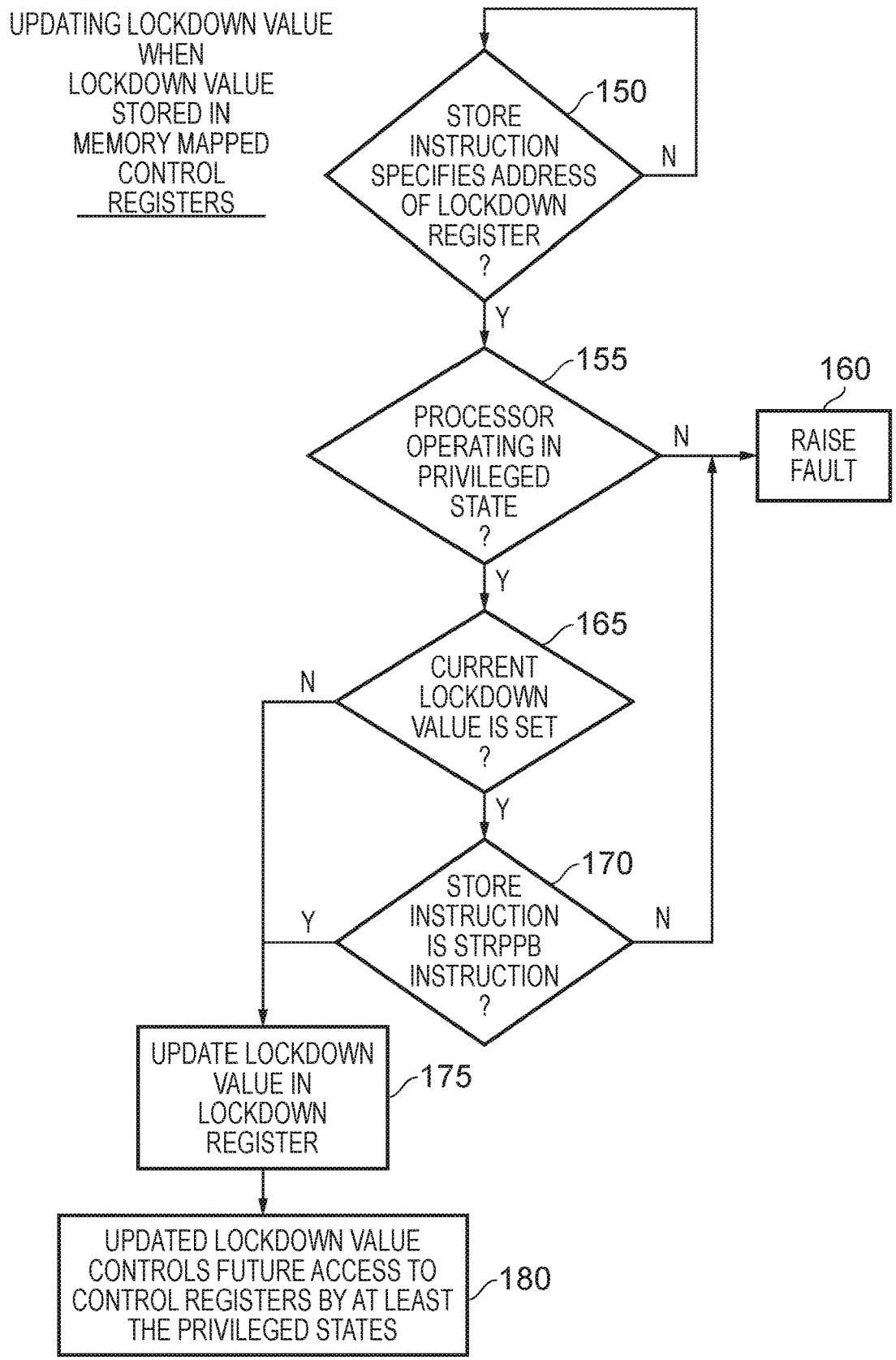
FIG. 5 is a flow diagram illustrating steps that may be performed in order to update a lockdown value within the lockdown register of FIG. 1 in situations where the lockdown register is provided as one of the memory mapped control registers, in accordance with one example arrangement.

FIG. 5 is a flow diagram illustrating how the lockdown value within the lockdown register may be updated when the lockdown register is implemented by one of the memory mapped control registers. At step 150, it is determined whether a store instruction currently being executed is specifying an address of the lockdown register. When such a scenario is encountered, then at step 155 it is determined whether the processor is operating in a required privileged state. In particular, it is envisaged that only software executing at a certain privileged state will be allowed to update the contents of the lockdown register. If the processor is not operating in the required privileged state then a fault exception is raised at step 160.

However, if the processor is operating at the required privileged state, then at step 165 it is determined whether the current lockdown value is set. If not, then in one example implementation the lockdown value can be set using any store instruction, and accordingly the process proceeds to step 175 where the lockdown value is updated in the lockdown register. However, if the current lockdown value is set, then it is only allowed to be updated using a control register specific store instruction, also referred to herein as an STRPPB instruction. Accordingly, if at step 165 it is determined that the current lockdown value is set, then it is determined at step 170 whether the store instruction that is seeking to update the lockdown register is an STRPPB instruction. If not, then a fault exception is raised at step 160. However, if an STRPPB instruction is being used, then the process proceeds to step 175 where the lockdown value is updated in the lockdown register to reflect the new value specified by the store instruction. Thereafter, as indicated by step 180, the updated lockdown value controls future access to the memory mapped control registers by at least the privileged states.

It may be the case that most of the access control registers are only accessed from the privileged state anyway, but one or more of the control registers may be allowed to be accessed from the unprivileged state. In some implementations once the lockdown bit has been set, then irrespective of whether the software is executing in the unprivileged state or the privileged state, it will be necessary for control register specific store or control register specific load instructions to be used to perform accesses to those control registers. In other implementations the lockdown bit only effects accesses from the privileged state, hence once it is set it will be necessary for control register specific store or control register specific load instructions to be used to perform accesses to those control registers from the privileged state, however any load and store instructions may be permitted to access (subject to any other access checks passing) the control registers from the unprivileged state.

If an access to only a single memory mapped control register is required whilst the lockdown value is set, then in one example implementation the earlier described control register specific store (STRPPB) and load (LDRPPB) instructions will be used.

Figure 6:
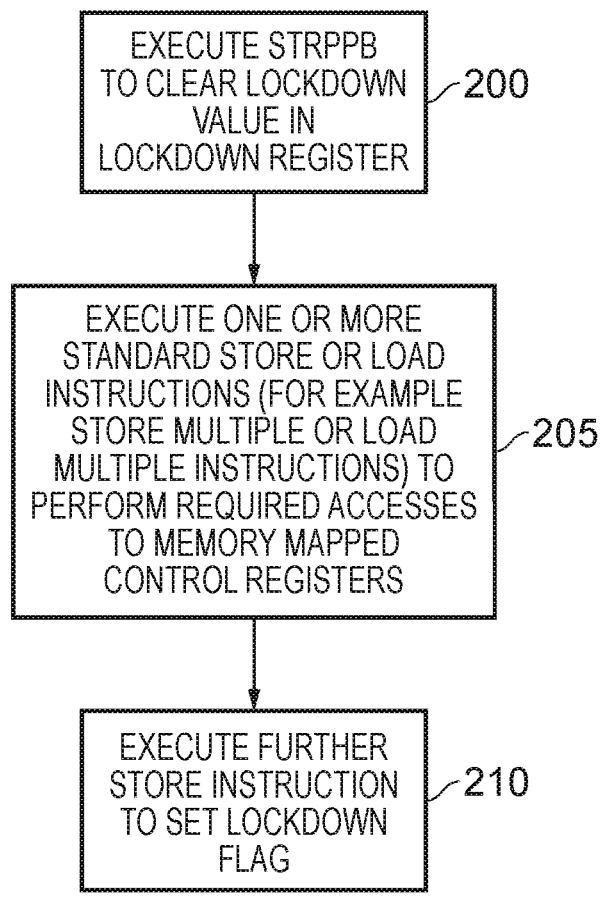
FIG. 6 illustrates how a bulk access to the memory mapped control registers may be performed in accordance with one example arrangement.

However, it may be considered inappropriate to seek to provide control register specific variants of every possible type of store and load instruction. For example, it is typically the case that the instruction encoding space is at a premium, and accordingly it may not be possible to provide control register specific variants of each of those instructions. Some memory access instructions allow for bulk access to memory, and such instructions may be referred to as store multiple or load multiple instructions herein. They provide an efficient mechanism for performing bulk updates to memory, and accordingly it may be efficient to also use such instructions to perform bulk updates to multiple memory mapped control registers. FIG. 6 is a flow diagram illustrating a mechanism that can be used to perform such a bulk access when control register specific variants of the bulk store or load instructions are not provided.

At step 200, an STRPPB instruction is executed to clear the lockdown value in the lockdown register. Thereafter, this opens up a window where any store or load instructions can be used to access the memory mapped control registers. Accordingly, at step 205 one or more standard store or load instructions can be executed in order to perform required accesses to the memory mapped control registers. For example, at this point the earlier described store multiple or load multiple instructions may be used in order to improve the efficiency of access.

Once the required bulk access has been performed, then a further store instruction can be executed at step 210 in order to set the lockdown flag. It should be noted at this point that there is no requirement in the implementation described herein for the store instruction at step 210 to be an STRPPB instruction, and instead any suitable store instruction can be used to set the lockdown flag. This is because the setting of the lockdown flag only serves to enhance the security of the system, and accordingly does not need to be restricted. However, in contrast clearing a lockdown value may allow any memory access instructions to be used to access the memory mapped control registers, provided any relevant memory access checks are performed. Accordingly, it is desirable for the clearing of the lockdown value to be tightly controlled, and this is why in the implementations described herein it is necessary to use an STRPPB instruction to clear the lockdown value in the lockdown register.

Figure 7:
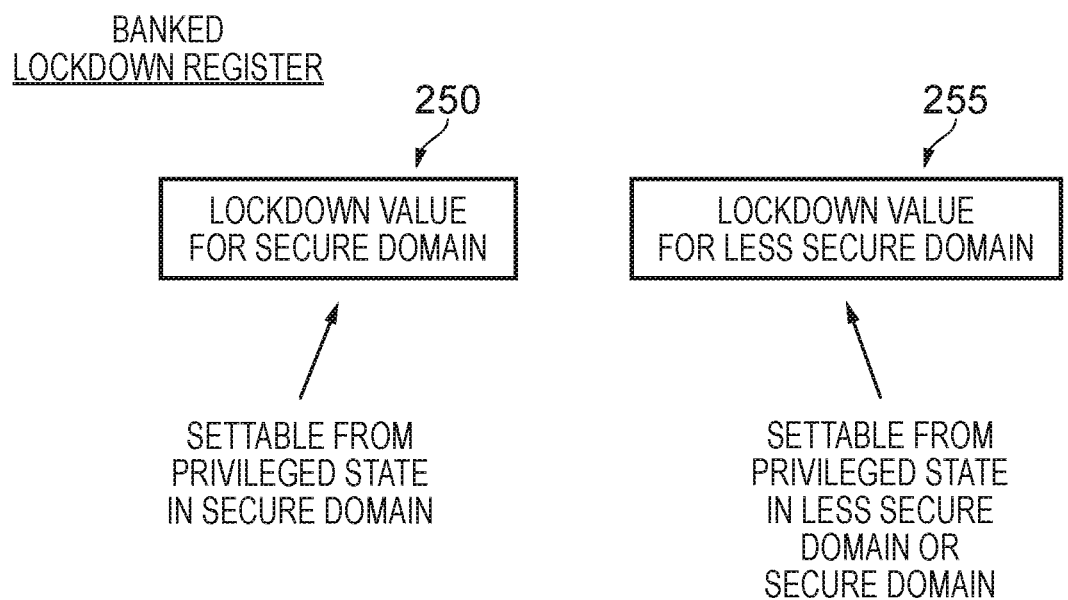
FIG. 7 illustrates how the lockdown registers may be banked for different security domains in accordance with one example arrangement.

As discussed earlier, the apparatus may be able to operate in different security domains that comprise at least a secure domain and a less secure domain. For each security domain, it is possible to provide a different lockdown value, and hence the lockdown register may be banked as shown in FIG. 7 to enable lockdown values to be stored for each of the security domains. Hence, a lockdown value 250 for the secure domain may be provided and a separate lockdown value 255 for the less secure domain may be provided. In one example implementation, the lockdown value 250 for the secure domain will be settable from the privileged state in the secure domain, whilst the lockdown value 255 for the less secure domain will be settable from the privileged state in the less secure domain or from the privileged state in the secure domain. In other implementations the lockdown register may be banked between the privileged and unprivileged states such that both states can independently control whether specific variants of the load and store instructions are required when accesses to the memory mapped control registers 30 are performed from that state. In a further example implementation the lockdown register may be banked between the security domains and the privilege states such that each of the four states shown in FIG. 3A can independently control whether the specific variants of the load and store instructions are required when accesses to the memory mapped control registers 30 are performed from that state.

Figure 8A:
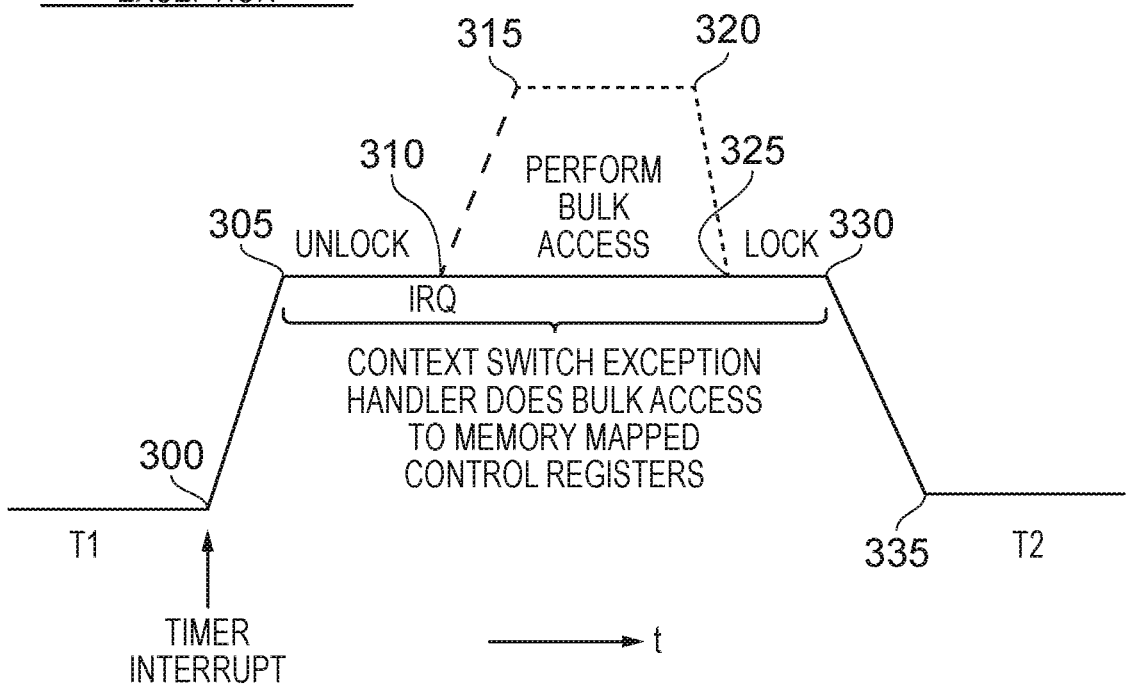
FIG. 8A illustrates how the lockdown value may be handled during an exception in accordance with one example arrangement.
Figure 8B:
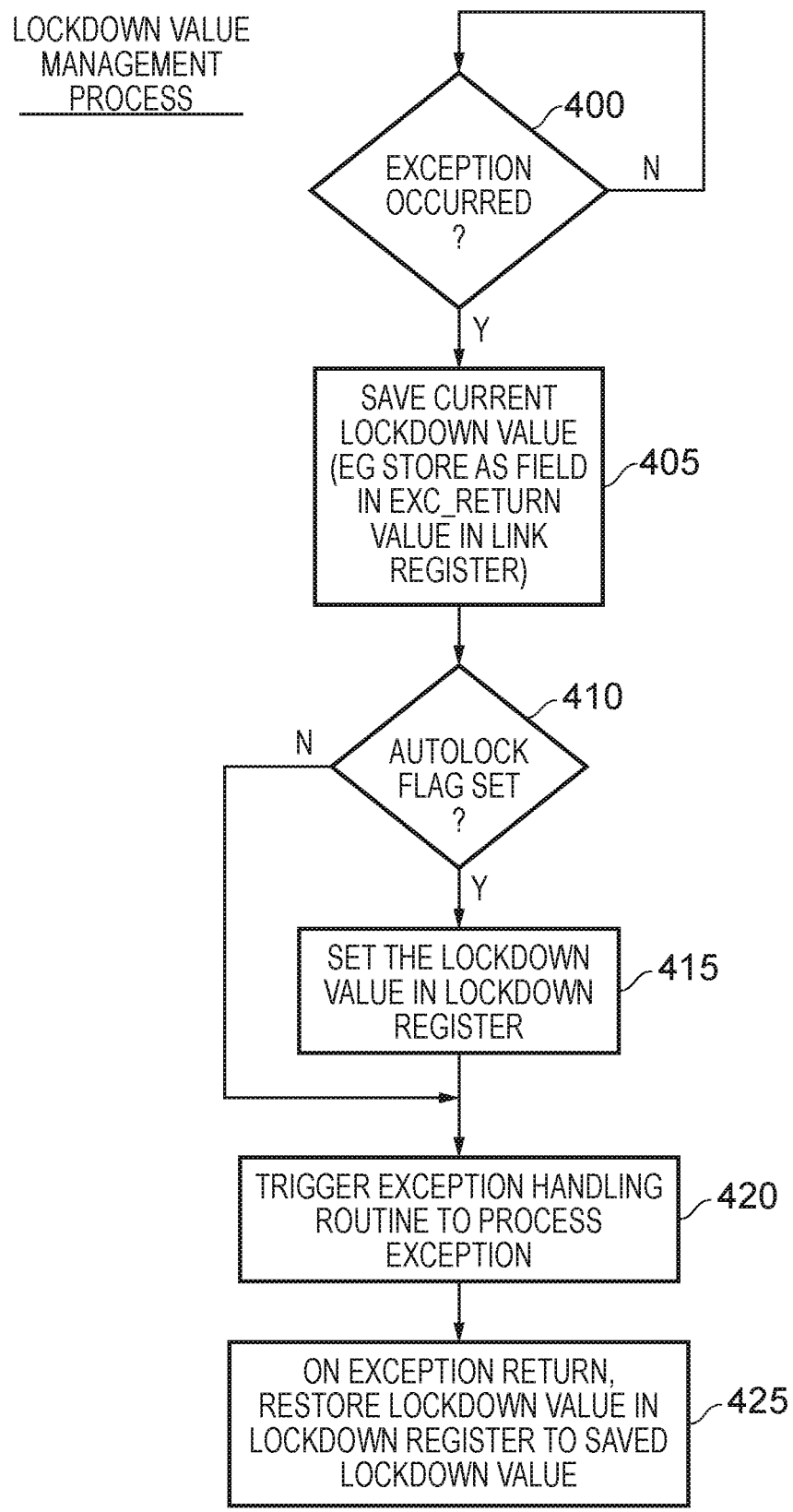
FIG. 8B is a flow diagram illustrating a lockdown value management process performed in one example implementation on occurrence of an exception.

As discussed earlier, in one example implementation access to the PPB memory address space used to provide the memory mapped control registers can be temporarily unlocked in order to perform a block of register accesses (for example on a context switch). However, if an interrupt occurs during such a context switch the interrupt handler may end up unintentionally running with access to the PPB address space. Although it would be more difficult for an attacker to exploit an attack based on this scenario, it may be desirable to inhibit the ability for such an attack to be performed. FIGS. 8A and 8B illustrate how this is achieved in one example implementation, through the use of the earlier mentioned autolock register 36.

FIG. 8A illustrates a situation where a thread T1 is operating as a background thread, and then at point 300 a timer interrupt is triggered in order to transition at point 305 to an exception handler that is used to perform the earlier-described context switch and bulk access to the memory mapped control registers. In accordance with the earlier-described process with reference to FIG. 6, the exception handler code will at this point unlock the PPB address space by clearing the lockdown value, and then will perform a bulk access required to perform the context switch whereafter the lockdown value will be set again in order to lock the PPB address space again, whereafter at point 330 handling of the exception will terminate, and the process will return at point 335 to execution of a different background thread T2.

However, if at point 310 a higher priority interrupt occurs that causes the interrupt to be taken partway through performance of the context switch exception handler code that is performing the bulk access, then the interrupt will be accepted at point 310 and cause a transition to different exception handler code required to process that interrupt at point 315. At this point, it will be noted that the memory mapped control register address space has been unlocked, and accordingly the exception handler operating between points 315 and 320 would have access to the memory mapped control registers, which may be unintentional. When that exception handler code is completed at point 320, then processing will return to point 325, whereafter the context switch exception handler routine being processed in response to the original timer interrupt will continue to perform the bulk access and then relock the PPB address space by resetting the lockdown value, prior to transitioning to the background code T2 between points 330 and 335.

It would be desirable to prevent the unintended consequence of the exception handling routine executed between points 315 and 320 having unfettered access to the memory mapped control registers. As shown in FIG. 8B, this can be achieved through use of an autolock value in the autolock register 36. At step 400, it is determined whether an exception has occurred, and if so the current lockdown value is saved at step 405. There are a number of ways in which the current lockdown value may be saved, but in one example the current lockdown value is stored as a field in an exception return value that is stored in a link register. Whilst the link register can be used to capture the exception return address on exception entry, in some implementations a portion of the address space is reserved and not executable. Branching to an address in such portions of the address space can therefore be used to signal special conditions, like a request for the hardware to perform an exception return to the background state. In one example implementation, on entry to an exception, the exception return address captured in the link register can be set to a dummy return address specifying an address within the reserved, non-executable, address space, with the actual return address instead being saved on a stack, and the current lockdown value can then be included as part of the dummy return address in the link register.

Hence, considering FIG. 8A, at point 300, the current lockdown value applicable to the background thread T1 can be saved at step 405. Thereafter, at step 410 it is determined whether the autolock flag is set within the autolock register 36. If not, then no additional protection in respect of exceptions is implemented, and the process may proceed as described earlier with reference to FIG. 8A in particular, at step 420, the exception handling routine can be triggered to process the exception, and then at step 425, on an exception return, the lockdown value can be restored in the lockdown register to the saved lockdown value.

However, if the autolock flag is set, then as shown in FIG. 8B the process first proceeds to step 415 where the lockdown value is set in the lockdown register. With reference to FIG. 8A, this means that at point 305 the lockdown value is set irrespective of the value of the lockdown value applicable to thread T1 at point 300. The exception handler used to process the SVC can then continue as normal by unlocking the PPB address space, performing the bulk access, and relocking the PPB address space by resetting the lockdown value.

However, when the autolock flag is set, this removes the problem that occurs if a high priority interrupt is received at point 310. In particular, by performance of the process shown in FIG. 8B, it will be seen that the current lockdown value (in this case a clear value since the context switch exception handling routine executed in response to the timer interrupt will by this point have cleared the lockdown value) can be saved, but in addition it will be determined that the autolock flag is set. Accordingly, on transition at point 315 to execution of the exception handling routine required by the interrupt detected at point 310, the lockdown value in the lockdown register will be reset. This means that the lockdown value will be set for the duration of execution of the exception handling routine between points 315 and 320, hence avoiding any unintentional ability to freely access the memory mapped control registers whilst performing that exception handling routine. On return from the exception at point 325, then as indicated by step 425 of FIG. 8B the lockdown value will be restored in the lockdown register, which in the context of the example of FIG. 8A will mean that the lockdown value is again cleared, allowing the bulk access to be performed by the context switch exception handler before relocking the PPB memory address space.

Figure 9:
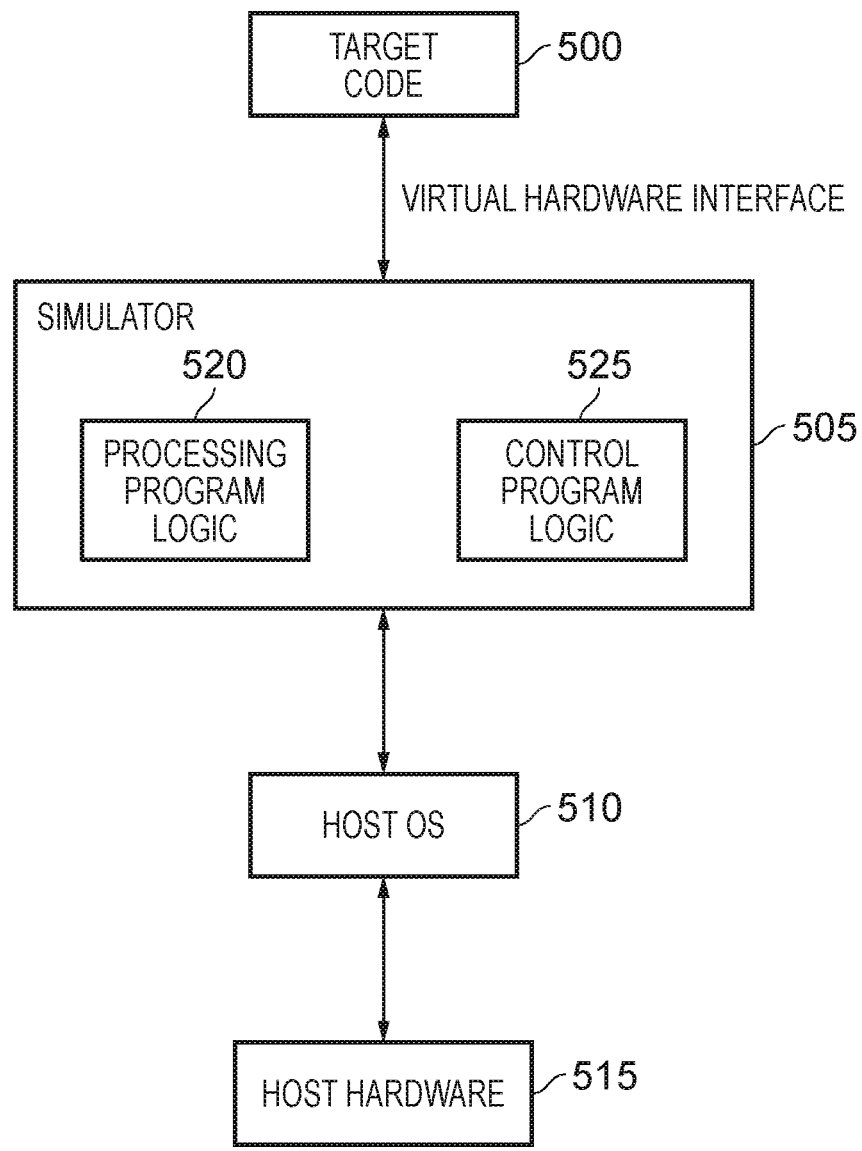
FIG. 9 shows a simulator example that can be used.

FIG. 9 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically a simulator implementation may run on a host processor 515, optionally running a host operating system 510, supporting the simulator program 505. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 26 in the hardware apparatus 2 could be emulated as a simulated address space which is mapped on to the virtual address space used by the host operating system 510 by the simulator 505. In arrangements where one or more of the hardware elements referenced in the previously described examples are present on the host hardware (for example host processor 515), some simulated implementations may make use of the host hardware, where suitable.

The simulator program 505 may be stored on a computer readable storage medium (which may be a non-transitory medium), and provides a virtual hardware interface (instruction execution environment) to the target code 500 (which may include applications, guest operating systems and a hypervisor) which is the same as the hardware interface of the hardware architecture being modelled by the simulator program 505. Thus, the program instructions of the target code 500 may be executed from within the instruction execution environment using the simulator program 505, so that a host computer 515 which does not actually have the hardware features of the apparatus 2 discussed above can emulate those features. The simulator program may include processing program logic 520 to emulate the behaviour of the processing pipeline 4, and control program logic 525 to maintain a set of memory mapped control data structures to emulate the memory mapped control registers 30, including a lockdown data structure to store the lockdown value. The architectural registers 6 of the system 2 may also be emulated using data structure emulating program logic (not shown) maintained by the simulator code 505, for mapping the architectural registers of a target architecture on to the memory space used by the host hardware 515. Hence, the techniques described herein for controlling access to a set of memory mapped control registers dependent on a lockdown value can in the example of FIG. 9 be performed in software by the simulator program 505.

Through use of the techniques described herein, the ability of an attacker to exploit software bugs to seek to modify the contents of memory mapped control registers can be significantly inhibited, hence reducing the prospect of an attacker compromising the system by modification of the control information within those memory mapped control registers.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute program code to perform data processing operations;
a set of memory mapped control registers to store control information used to control operation of the processing circuitry when executing the program code; and
a lockdown register to store a lockdown value;
wherein:
the processing circuitry is arranged to execute store instructions in order to perform write operations to a memory address space, the store instructions being of multiple types; and
the processing circuitry is arranged, when the lockdown value is set, to prevent a write operation being performed to change the control information in the memory mapped control registers unless that write operation occurs due to execution of a store instruction from a first subset of the multiple types of store instructions;
the control information stored in the memory mapped control registers comprises at least control information used to control which regions of the memory address space are accessible to trusted program code and untrusted program code; and
the processing circuitry is arranged to allow the trusted program code to update the lockdown value in the lockdown register, and is arranged to use the lockdown value to control performance of write operations to the memory mapped control registers by at least the trusted program code.

2. The apparatus as claimed in claim 1, wherein the processing circuitry is arranged, when the lockdown value is clear, to allow a second subset of the multiple types of store instructions in addition to the first subset to be used to perform write operations to change the control information in the memory mapped control registers, wherein the second subset is non-overlapping with the first subset.

3. The apparatus as claimed in claim 2, wherein, when the lockdown value is set, the processing circuitry is arranged to raise a fault exception when a store instruction from said second subset of the multiple types of store instructions attempts to perform a write operation to the set of memory mapped control registers.

4. The apparatus as claimed in claim 1, wherein:
the processing circuitry is further arranged, when the lockdown value is set, to only allow the control information in the memory mapped control registers to be read when that read occurs due to execution of a load instruction from a first subset of multiple types of load instructions, and to prevent the control information in the memory mapped control registers being read when that read occurs due to execution of a load instruction from a second subset of the multiple types of load instructions non-overlapping with the first subset.

5. The apparatus as claimed in claim 4, wherein, when the lockdown value is set, the processing circuitry is arranged to raise a fault exception when a load instruction from the second subset of the multiple types of load instructions attempts to perform a read operation to the set of memory mapped control registers.

6. The apparatus as claimed in claim 4, wherein:
the first subset of the multiple types of load instructions comprises a control register specific load instruction, wherein the processing circuitry is arranged, when executing the control register specific load instruction, to ignore the lockdown value when determining whether to allow the associated read operation to the memory mapped control registers to be performed; and
the processing circuitry is arranged, when executing the control register specific load instruction, to raise a fault exception when a memory address identified by the control register specific load instruction lies outside a memory address range associated with the set of memory mapped control registers.

7. The apparatus as claimed in claim 1, wherein the first subset of the multiple types of store instructions comprises a control register specific store instruction, wherein the processing circuitry is arranged, when executing the control register specific store instruction, to ignore the lockdown value when determining whether to allow the associated write operation to the memory mapped control registers to be performed.

8. The apparatus as claimed in claim 7, wherein the processing circuitry is arranged, when executing the control register specific store instruction, to raise a fault exception when a memory address identified by the control register specific store instruction lies outside a memory address range associated with the set of memory mapped control registers.

9. The apparatus as claimed in claim 8, wherein the memory address is identified in dependence on a value stored in a register specified by the control register specific store instruction and an immediate value specified by the control register specific store instruction.

10. The apparatus as claimed in claim 7, wherein:
the lockdown register is provided within the set of memory mapped control registers, and the processing circuitry is arranged to change the lockdown value in the lockdown register by execution of an instance of the control register specific store instruction with a specified memory address that maps to the lockdown register.

11. The apparatus as claimed in claim 10, wherein the processing circuitry is controllable by software to perform a sequence of accesses to the memory mapped control registers by executing the control register specific store instruction to clear the lockdown value, executing one or more standard access instructions to access the memory mapped control registers, and then executing a store instruction to set the lockdown value.

12. The apparatus as claimed in claim 11, wherein the one or more standard access instructions comprise at least one store multiple instruction or load multiple instruction.

13. The apparatus as claimed in claim 1, wherein the processing circuitry is arranged to use the lockdown value to control performance of write operations to the memory mapped control registers by both the untrusted program code and the trusted program code.

14. The apparatus as claimed in claim 13, wherein:
the processing circuitry is arranged to execute the program code in one of a plurality of states comprising at least an unprivileged state and a privileged state, the trusted program code is program code executed by the processing circuitry in the privileged state and the untrusted program code is program code executed by the processing circuitry in the unprivileged state.

15. The apparatus as claimed in claim 13, wherein:
the processing circuitry is arranged to execute the program code in one of a plurality of security domains comprising at least a secure domain and a less secure domain, the trusted program code is program code executed by the processing circuitry in the secure domain and the untrusted program code is program code executed by the processing circuitry in the less secure domain.

16. The apparatus as claimed in claim 15, wherein:
in each of the security domains the processing circuitry is arranged to execute the program code in one of a plurality of states comprising at least the unprivileged state and the privileged state; and
the lockdown register is arranged to provide a lockdown value for each security domain.

17. The apparatus as claimed in claim 1, wherein the processing circuitry is arranged ignore the lockdown value when determining whether to allow a write operation to the memory mapped control registers by untrusted program code.

18. The apparatus as claimed in claim 1, wherein:
the processing circuitry is arranged to perform a lockdown value management process in association with an exception, the lockdown value management process comprising:
on occurrence of an exception, saving the lockdown value currently stored in the lockdown register, and setting the lockdown value in the lockdown register prior to triggering execution of an exception handling routine to process the exception; and
on return from the exception handing routine, restoring the lockdown value in the lockdown register to the saved lockdown value.

19. The apparatus as claimed in claim 18, further comprising:
an autolock register to store an autolock value;
wherein the processing circuitry is arranged to perform the setting of the lockdown value in association with the lockdown value management process on the occurrence of an exception, only when the autolock value is set.

20. The apparatus as claimed in claim 18, wherein during the lockdown value management process the lockdown value currently stored in the lockdown register is saved as a field within a link register.

21. A method of controlling access to a set of memory mapped control registers within an apparatus, comprising:
executing program code on processing circuitry to perform data processing operations;
storing, within the set of memory mapped control registers, control information used to control operation of the processing circuitry when executing the program code;
storing within a lockdown register a lockdown value;
executing store instructions on the processing circuitry in order to perform write operations to a memory address space, the store instructions being of multiple types; and
when the lockdown value is set, preventing a write operation being performed to change the control information in the memory mapped control registers unless that write operation occurs due to execution by the processing circuitry of a store instruction from a first subset of the multiple types of store instructions; wherein
the control information stored in the memory mapped control registers comprises at least control information used to control which regions of the memory address space are accessible to trusted program code and untrusted program code; and
the processing circuitry is arranged to allow the trusted program code to update the lockdown value in the lockdown register, and is arranged to use the lockdown value to control performance of write operations to the memory mapped control registers by at least the trusted program code.

22. A non-transitory computer-readable storage medium storing a computer program for controlling a host data processing apparatus to provide an instruction execution environment, comprising:
processing program logic to execute program code to perform data processing operations; and
control program logic to maintain a set of memory mapped control data structures to store control information used to control operation of the processing program logic when executing the program code, and to maintain a lockdown data structure to store a lockdown value;
wherein:
the processing program logic is arranged to execute store instructions in order to perform write operations to a memory address space, the store instructions being of multiple types;
the processing program logic is arranged, when the lockdown value is set, to prevent a write operation being performed to change the control information in the memory mapped control data structures unless that write operation occurs due to execution of a store instruction from a first subset of the multiple types of store instructions;
the control information stored in the memory mapped control data structures comprises at least control information used to control which regions of the memory address space are accessible to trusted program code and untrusted program code; and
the processing program logic is arranged to allow the trusted program code to update the lockdown value in the lockdown data structure, and is arranged to use the lockdown value to control performance of write operations to the memory mapped control data structures by at least the trusted program code.

* * * * *